(12) United States Patent
Tan et al.

(10) Patent No.: US 10,439,215 B2
(45) Date of Patent: Oct. 8, 2019

(54) NICKEL LITHIUM ION BATTERY POSITIVE ELECTRODE MATERIAL HAVING CONCENTRATION GRADIENT, AND PREPARATION METHOD THEREFOR

(71) Applicant: INSTITUTE OF PROCESS ENGINEERING, CHINESE ACADEMY OF SCIENCES, Beijing (CN)

(72) Inventors: Qiangqiang Tan, Beijing (CN); Guangwei Kan, Beijing (CN); Yuxing Xu, Beijing (CN)

(73) Assignee: INSTITUTE OF PROCESS ENGINEERING, CHINESE ACADEMY OF SCIENCES (CN)

( * ) Notice: Subject to any disclaimer, the term of this patent is extended or adjusted under 35 U.S.C. 154(b) by 250 days.

(21) Appl. No.: 15/522,800

(22) PCT Filed: Dec. 15, 2014

(86) PCT No.: PCT/CN2014/093853
§ 371 (c)(1),
(2) Date: Apr. 28, 2017

(87) PCT Pub. No.: WO2016/065703
PCT Pub. Date: May 6, 2016

(65) Prior Publication Data
US 2017/0317344 A1 Nov. 2, 2017

(30) Foreign Application Priority Data
Oct. 30, 2014 (CN) .......................... 2014 1 0598637

(51) Int. Cl.
*H01M 4/36* (2006.01)
*H01M 4/505* (2010.01)
(Continued)

(52) U.S. Cl.
CPC ............ *H01M 4/366* (2013.01); *C01G 53/42* (2013.01); *C01G 53/44* (2013.01); *C01G 53/50* (2013.01);
(Continued)

(58) Field of Classification Search
CPC ...... H01M 4/366; H01M 4/505; H01M 4/525; C01G 53/42; C01G 53/44; C01G 53/50
See application file for complete search history.

(56) References Cited

U.S. PATENT DOCUMENTS

2009/0068561 A1* 3/2009 Sun ........................ H01M 4/131
429/223
2011/0027651 A1* 2/2011 Sun .......................... C01B 15/00
429/220

(Continued)

FOREIGN PATENT DOCUMENTS

CN 101355159 A 1/2009
CN 102637866 A 8/2012
(Continued)

OTHER PUBLICATIONS

Patent Cooperation Treaty (PCT), International Search Report and Written Opinion for Application PCT/CN2014/093853 filed Dec. 15, 2014, dated Mar. 27, 2015, International Searching Authority, CN.

*Primary Examiner* — Jonathan G Jelsma
(74) *Attorney, Agent, or Firm* — McDonald Hopkins LLC

(57) ABSTRACT

A nickel lithium ion battery positive electrode material having a concentration gradient, and a preparation method therefor. The material is a core-shell material having a concentration gradient, the core material is a material having a high content of nickel, and the shell material is a ternary material having a low content of nickel. The method comprises: synthesizing a material precursor having a high content of nickel by means of co-precipitation, co-precipi-
(Continued)

tating a ternary material solution having a low content of nickel outside the material precursor having a high content of nickel, aging, washing, and drying to form a composite precursor in which the low nickel material coats the high nickel material, adding a lithium source, grinding, mixing, calcining, and cooling to prepare a high nickel lithium ion battery positive electrode material. The obtained material has regular morphology, uniform coating, narrow particle size distribution range, gradient distribution of the concentration of the nickel element, high content of the nickel element in the core, and low content of the nickel element in the shell; the nickel element in the core guarantees the specific capacity of the material, and the shell coating material maintains the stability of the structure of the material, so as to improve the safety of the material in the charge and discharge process, and improve the cycle and rate performance of the material.

8 Claims, 3 Drawing Sheets

(51) Int. Cl.
*H01M 4/525* (2010.01)
*C01G 53/00* (2006.01)
*H01M 10/0525* (2010.01)
*H01M 4/02* (2006.01)

(52) U.S. Cl.
CPC ........... *H01M 4/505* (2013.01); *H01M 4/525* (2013.01); *H01M 10/0525* (2013.01); *C01P 2002/72* (2013.01); *C01P 2004/03* (2013.01); *C01P 2004/61* (2013.01); *C01P 2004/84* (2013.01); *C01P 2004/88* (2013.01); *C01P 2006/40* (2013.01); *H01M 2004/021* (2013.01); *H01M 2004/028* (2013.01)

(56) References Cited

U.S. PATENT DOCUMENTS

| | | | | |
|---|---|---|---|---|
| 2011/0291042 | A1* | 12/2011 | Li | C01G 45/1228 252/182.1 |
| 2012/0135310 | A1* | 5/2012 | Sun | C01G 53/50 429/223 |
| 2013/0202966 | A1* | 8/2013 | Yu | H01M 4/131 429/223 |
| 2014/0242463 | A1* | 8/2014 | Song | H01M 4/366 429/219 |
| 2015/0010821 | A1* | 1/2015 | Makimura | H01M 4/505 429/221 |
| 2015/0380720 | A1* | 12/2015 | Kim | H01M 4/1391 320/130 |

FOREIGN PATENT DOCUMENTS

| | | |
|---|---|---|
| CN | 102637886 A | 8/2012 |
| CN | 103151511 A | 6/2013 |
| KR | 20070049810 A | 5/2007 |
| WO | 2007114557 A1 | 10/2007 |

* cited by examiner

NICKEL LITHIUM ION BATTERY POSITIVE ELECTRODE MATERIAL HAVING CONCENTRATION GRADIENT, AND PREPARATION METHOD THEREFOR

CROSS-REFERENCE TO RELATED APPLICATION

This application is a 35 U.S.C. 371 national stage filing of PCT Application No. PCT/CN2014/093853, filed on Dec. 15, 2014, which claims priority to Chinese Patent Application No. 201410598637.5, filed on Oct. 30, 2014, both of which are incorporated herein in their entirety by reference.

TECHNICAL FIELD

The present invention belongs to the technical field of lithium ion battery, particularly relates to a cathode material for nickel lithium ion battery with a concentration gradient and a process for preparing the same.

BACKGROUND ART

With the rapid development of electric vehicles, lithium batteries have been more widely used. Lithium battery materials develop rapidly, and longer driving mileage of electric vehicles requires a higher energy density of the lithium-ion battery. Because of high specific capacity, good performance and low price, ternary material has been developed rapidly. Among them, high-nickel ternary material is deemed as one of the most promising cathode material for lithium ion battery due to a higher specific capacity.

During the practical application process of high nickel materials, there are battery safety problems, while there are problems of large magnification and poor cyclic electrochemical performance. In order to improve the lithium battery capacity, while taking into account the battery safety issues, high nickel materials and other materials (such as $LiMn_2O_4$, $LiCoO_2$, $Li(Ni_{1/3}Co_{1/3}Mn_{1/3})O_2$, etc.) are generally mixed, or the electrochemical performance is improved by coating, so as to achieve the purpose of improving the overall efficiency.

CN103715413A provides a process for preparing monocrystalline ternary cathode material coated with ZnO, comprising weighing lithium carbonate, ternary precursor $[Ni_{0.5}Co_{0.2}Mn_{0.3}]$ and magnesium oxide, mixing and calcining to obtain a Sample one, then weighing lithium carbonate, cobalt oxide, magnesium oxide, mixing and calcining to obtain a Sample two, weighing the Sample one, Sample two and titanium dioxide, mixing, calcining to obtain the final mixture. The process comprises coating the ternary material by a solid phase method, mixing with lithium cobaltate and calcining for use. The resultant material has no uniform coating, more agglomeration of particles, complex operation process and high cost.

CN103618064A provides a process for preparing alumina-compounded nickel-cobalt-lithium manganate ternary material, comprising using the soluble salts of Ni, Co and Mn and ammonia as the complexing agent, sodium hydroxide, sodium carbonate, ammonium bicarbonate as the precipitant, co-precipitating to synthesize a composite ternary precursor, then adding dropwise the soluble salt solution of aluminium into the synthesized precursor solution, filtering, drying, dosing and calcining to form a ternary cathode material. The process provides a process of coating low-nickel ternary material ($LiNi_{1/3}Co_{1/3}Mn_{1/3}O_2$) with alumina. Although the cycle performance is improved, the electrochemical capacity is lower.

CN103022471A provides a method for improving the electrochemical performance of a high nickel ternary cathode material, comprising first preparing the soluble Co salt into a solution and then dispersing the high nickel ternary cathode material into the soluble cobalt salt solution and stirring, adding dropwise the soluble lithium salt, spray drying the resulting mixture liquid, and calcining to obtain a coated ternary cathode material. The process comprises re-coating the surface of the prepared ternary cathode material, drying by spraying, and then re-calcining, and the cost is higher.

It can be seen that there is a problem that the high-nickel-lithium battery material is insufficient in the prior art, and there are problems such as battery safety, electrochemical cycles, magnification and higher cost.

DISCLOSURE OF THE INVENTION

The technical problem which the present invention directs to is that the high-nickel-lithium battery material is insufficient, including the safety, electrochemical cycle and magnification problems. The present invention discloses a cathode material for nickel lithium ion battery with a concentration gradient and a preparation method thereof.

In order to achieve the object above, the present invention discloses the following technical solution.

A cathode material for nickel lithium ion battery with a concentration gradient is a core-shell material with a concentration gradient, wherein the core material has the structural formula of $LiNi_xM_yO_2$, wherein $0.5 \leq x \leq 1$, $0 \leq y \leq 0.5$, $x+y=1$, $M=Co_\alpha Mn_\beta$, $0 \leq \alpha \leq 1$, $0 \leq \beta \leq 1$, $\alpha+\beta=y$, e.g. $LiNi_{0.5}Mn_{0.5}O_2$, $LiNi_{0.5}Co_{0.1}Mn_{0.4}O_2$, $LiNi_{0.5}Co_{0.2}Mn_{0.3}O_2$, $LiNi_{0.5}Co_{0.4}Mn_{0.1}O_2$, $LiNi_{0.5}Co_{0.5}O_2$, $LiNi_{0.6}Mn_{0.4}O_2$, $LiNi_{0.6}Co_{0.1}Mn_{0.3}O_2$, $LiNi_{0.6}Co_{0.2}Mn_{0.2}O_2$, $LiNi_{0.6}Co_{0.4}O_2$, $LiNi_{0.7}Mn_{0.3}O_2$, $LiNi_{0.7}Co_{0.1}Mn_{0.2}O_2$, $LiNi_{0.7}Co_{0.2}Mn_{0.1}O_2$, $LiNi_{0.7}Co_{0.3}O_2$, $LiNi_{0.8}Mn_{0.2}O_2$, $LiNi_{0.8}Co_{0.1}Mn_{0.1}O_2$, $LiNi_{0.8}Co_{0.2}O_2$, $LiNi_{0.9}Mn_{0.1}O_2$, $LiNi_{0.9}Co_{0.1}O_2$, $LiNiO_2$, and the like; the structural formula of the core material may be $LiNi_xM_yO_2$, wherein $0.5 \leq x \leq 1$, $0 \leq y \leq 0.5$, $x+y=1$, $M=Co_\alpha Al_\beta$, $0 \leq \alpha \leq 1$, $0 \leq \beta \leq 1$, $\alpha+\beta=y$, e.g. $LiNi_{0.5}Co_{0.5}O_2$, $LiNi_{0.5}Co_{0.4}Al_{0.1}O_2$, $LiNi_{0.5}Co_{0.3}Al_{0.2}O_2$, $LiNi_{0.5}Co_{0.1}Al_{0.4}O_2$, $LiNi_{0.5}Al_{0.5}O_2$, $LiNi_{0.6}Co_{0.4}O_2$, $LiNi_{0.6}Co_{0.3}Al_{0.1}O_2$, $LiNi_{0.6}Co_{0.2}Al_{0.2}O_2$, $LiNi_{0.6}Al_{0.4}O_2$, $LiNi_{0.7}Co_{0.3}O_2$, $LiNi_{0.7}Co_{0.2}Al_{0.1}O_2$, $LiNi_{0.7}Co_{0.1}Al_{0.2}O_2$, $LiNi_{0.7}Al_{0.3}O_2$, $LiNi_{0.8}Co_{0.2}O_2$, $LiNi_{0.8}Al_{0.2}O_2$, $LiNi_{0.9}Co_{0.1}O_2$, $LiNi_{0.9}Al_{0.1}O_2$, $LiNiO_2$ and the like.

The core material may also be a mixture of the materials having the aforesaid two structures.

The core material is a high-nickel material.

The shell material is a nickel-containing ternary material having the structural formula of $LiNi_xCo_yMn_zO_2$, wherein $0<x \leq 0.5$, $0<y \leq 1$, $0<z \leq 1$, $x+y+z=1$, e.g. $LiNi_{0.5}Co_{0.5}O_2$, $LiNi_{0.5}Co_{0.4}Mn_{0.1}O_2$, $LiNi_{0.5}Co_{0.3}Mn_{0.2}O_2$, $LiNi_{0.5}Co_{0.2}Mn_{0.3}O_2$, $LiNi_{0.5}Co_{0.1}Mn_{0.4}O_2$, $LiNi_{0.5}Mn_{0.5}O_2$, $LiNi_{0.4}Co_{0.6}O_2$, $LiNi_{0.4}Co_{0.5}Mn_{0.1}O_2$, $LiNi_{0.4}Co_{0.3}Mn_{0.3}O_2$, $LiNi_{0.4}Co_{0.1}Mn_{0.5}O_2$, $LiNi_{0.4}Mn_{0.6}O_2$, $LiNi_{0.3}Co_{0.7}O_2$, $LiNi_{0.3}Co_{0.5}Mn_{0.3}O_2$, $LiNi_{0.3}Co_{0.3}Mn_{0.4}O_2$, $LiNi_{0.4}Co_{0.1}Mn_{0.5}O_2$, $LiNi_{0.4}Mn_{0.6}O_2$, $LiNi_{0.3}Co_{0.7}O_2$, $LiNi_{0.3}Co_{0.5}Mn_{0.2}O_2$, $LiNi_{0.3}Co_{0.3}Mn_{0.6}O_2$, $LiNi_{0.3}Co_{0.1}Mn_{0.6}O_2$, $LiNi_{0.3}Mn_{0.7}O_2$, $LiNi_{0.2}Co_{0.8}O_2$, $LiNi_{0.2}Co_{0.6}Mn_{0.2}O_2$, $LiNi_{0.2}Co_{0.4}Mn_{0.4}O_2$, $LiNi_{0.2}Co_{0.2}Mn_{0.6}O_2$, $LiNi_{0.2}Mn_{0.8}O_2$, $LiNi_{0.1}Co_{0.9}O_2$, $LiNi_{0.1}Co_{0.7}Mn_{0.2}O_2$, $LiNi_{0.1}Co_{0.5}Mn_{0.4}O_2$, $LiNi_{0.1}Co_{0.3}Mn_{0.6}O_2$, $LiNi_{0.1}Co_{0.1}Mn_{0.8}O_2$, $LiNi_{0.1}Mn_{0.9}O_2$ and the like.

The structural formula of the shell material may also be $LiNi_xCo_yAl_zO_2$, wherein $0<x\leq0.5$, $0<y\leq1$, $0<z\leq1$, $x+y+z=1$, e.g. $LiNi_{0.5}Co_{0.5}O_2$, $LiNi_{0.5}Co_{0.4}Al_{0.1}O_2$, $LiNi_{0.5}Co_{0.3}Al_2O_2$, $LiNi_{0.5}Co_{0.2}Al_{0.3}O_2$, $LiNi_{0.5}Co_{0.1}Al_{0.4}O_2$, $LiNi_{0.5}Al_{0.5}O_2$, $LiNi_{0.4}Co_{0.6}O_2$, $LiNi_{0.4}Co_{0.5}Al_{0.1}O_2$, $LiNi_{0.4}Co_{0.3}Al_{0.3}O_2$, $LiNi_{0.4}Co_{0.1}Al_{0.5}O_2$, $LiNi_{0.4}Al_{0.6}O_2$, $LiNi_{0.3}Co_{0.7}O_2$, $LiNi_{0.3}Co_{0.5}Al_{0.3}O_2$, $LiNi_{0.3}Co_{0.3}Al_{0.4}O_2$, $LiNi_{0.4}Co_{0.1}Al_{0.5}O_2$, $LiNi_{0.4}Al_{0.6}O_2$, $LiNi_{0.3}Co_{0.7}O_2$, $LiNi_{0.3}Co_{0.2}O_2$, $LiNi_{0.3}Co_{0.3}Al_{0.6}O_2$, $LiNi_{0.3}Co_{0.1}Al_{0.6}O_2$, $LiNi_{0.3}Al_{0.7}O_2$, $LiNi_{0.2}Co_{0.8}O_2$, $LiNi_{0.2}Co_{0.6}Al_{0.2}O_2$, $LiNi_{0.2}Co_{0.4}Al_{0.4}O_2$, $LiNi_{0.2}Co_{0.2}Al_{0.6}O_2$, $LiNi_{0.2}Al_{0.8}O_2$, $LiNi_{0.1}Co_{0.9}O_2$, $LiNi_{0.1}Co_{0.7}Al_{0.2}O_2$, $LiNi_{0.1}Co_{0.5}Al_{0.4}O_2$, $LiNi_{0.1}Co_{0.3}Al_{0.6}O_2$, $LiNi_{0.1}Co_{0.1}Al_{0.8}O_2$, $LiNi_{0.1}Al_9O_2$ and the like.

The shell material may also be a mixture of the materials having the aforesaid two structures.

The shell material is a low-nickel ternary material.

The core material has an average particle size of 5-15 μm, e.g. 5 μm, 6 μm, 7 μm, 8 μm, 9 μm, 10 μm, 11 μm, 12 μm, 13 μm, 14 μm, 15 μm and the like.

The shell material has an average thickness of 1-5 μm, e.g. 1 μm, 2 μm, 3 μm, 4 μm, 5 μm and the like, and the thickness thereof can be adjusted by controlling the amount of the solution added dropwise.

The process for preparing the cathode material for nickel lithium ion battery comprises the steps of:
(1) synthesizing a precursor of the core material by co-precipitation, then co-precipitating a shell material solution outside the core material precursor, aging, washing and drying to obtain a composite precursor in which the core material is coated with the shell material; and
(2) adding a lithium source into the composite precursor, grinding and mixing, calcining and cooling to prepare a cathode material for nickel lithium ion battery.

The co-precipitation of the core material precursor comprises the following steps:
(1) weighing in turn nickel salt, cobalt salt and manganese salt to formulate a solution;
(2) weighing a precipitator to formulate a precipitator solution having a concentration of 1-3 mol/L, adding an ammonia as a complexing agent to formulate a mixed solution;
(3) pumping into a reaction still the solution in step (1) and the mixed solution in step (2) via a constant flow pump;
(4) controlling the flow of the two solutions in step (3) and adjusting the pH, stirring under constant temperature conditions till the completion of adding dropwise the solution.

The co-precipitation of the core material precursor comprises the following steps:
(1') weighing in turn nickel salt, cobalt salt and aluminium salt to formulate a solution;
(2) weighing a precipitator to formulate a precipitator solution having a concentration of 1-3 mol/L, adding an ammonia as a complexing agent to formulate a mixed solution;
(3) pumping into a reaction still the solution in step (1') and the mixed solution in step (2) via a constant flow pump;
(4) controlling the flow of the two solutions in step (3) and adjusting the pH, stirring under constant temperature conditions till the completion of adding dropwise the solution.

The precipitator has a concentration of 1-3 mol/L, e.g. 1 mol/L, 1.3 mol/L, 1.5 mol/L, 1.7 mol/L, 2 mol/L, 2.3 mol/L, 2.5 mol/L, 2.7 mol/L or 3 mol/L and the like.

The nickel salt in the co-precipitation of the core material precursor is anyone selected from the group consisting of nickel chloride, nickel sulfate, nickel nitrate, nickel carbonate, nickel acetate, nickel phosphate and nickel oxalate, or a combination of at least two selected therefrom. The typical but non-limitative examples of the combination are selected from the group consisting of the combination of nickel chloride and nickel sulfate, the combination of nickel sulfate and nickel nitrate, the combination of nickel carbonate and nickel acetate, the combination of nickel acetate and nickel phosphate, the combination of nickel phosphate and nickel oxalate, the combination of nickel chloride, nickel sulfate and nickel nitrate, the combination of nickel sulfate, nickel nitrate, nickel carbonate and nickel acetate, the combination of nickel nitrate, nickel carbonate, nickel acetate, nickel phosphate and nickel oxalate and the like.

The cobalt salt in the co-precipitation of the core material precursor is anyone selected from the group consisting of cobalt chloride, cobalt sulfate, cobalt nitrate, cobalt carbonate, cobalt acetate, cobalt phosphate and cobalt oxalate, or a combination of at least two selected therefrom. The typical but non-limitative examples of the combination are selected from the group consisting of the combination of cobalt chloride and cobalt sulfate, the combination of cobalt sulfate and cobalt nitrate, the combination of cobalt nitrate and cobalt carbonate, the combination of cobalt acetate and cobalt phosphate, the combination of cobalt acetate, cobalt phosphate and cobalt oxalate, the combination of cobalt chloride, cobalt sulfate and cobalt nitrate, the combination of cobalt nitrate, cobalt carbonate, cobalt acetate, cobalt phosphate and cobalt oxalate.

The manganese salt in the co-precipitation of the core material precursor is anyone selected from the group consisting of manganese chloride, manganese sulfate, manganese acetate, manganese nitrate, manganese carbonate and manganese oxalate, or a combination of at least two selected therefrom. The typical but non-limitative examples of the combination are selected from the group consisting of the combination of manganese chloride and manganese sulfate, the combination of manganese sulfate and manganese acetate, the combination of manganese acetate and manganese nitrate, the combination of manganese carbonate and manganese sulfate, the combination of manganese sulfate and manganese oxalate, the combination of manganese chloride, manganese sulfate and manganese acetate, the combination of manganese acetate, manganese nitrate, manganese carbonate and manganese sulfate, the combination of manganese nitrate, manganese carbonate, manganese sulfate and manganese oxalate and the like.

The aluminium salt in the co-precipitation of the core material precursor is anyone selected from the group consisting of aluminum chloride, aluminum sulfate, aluminum nitrate, aluminum carbonate, aluminum acetate, aluminum phosphate and aluminum oxalate, or a combination of at least two selected therefrom. The typical but non-limitative examples of the combination are selected from the group consisting of the combination of aluminum chloride and aluminum sulfate, the combination of aluminum sulfate and aluminum acetate, the combination of aluminum acetate and aluminum nitrate, the combination of aluminum carbonate and aluminum acetate, the combination of aluminum phosphate and aluminum oxalate, the combination of aluminum chloride, aluminum sulfate and aluminum nitrate, the combination of aluminum carbonate, aluminum acetate and aluminum phosphate, the combination of aluminum acetate, aluminum phosphate and aluminum oxalate, the combination of aluminum carbonate, aluminum acetate, aluminum phosphate and aluminum oxalate and the like.

The nickel salt, cobalt salt and manganese salt in step (1) of the co-precipitation of the core material precursor have a metal element molar ratio of 6-9:0-2.5:0-2.5, including 0, e.g. 6:0:0, 6:0.5:0.5, 6:0.5:1, 6:2:1.5, 6:1:1, 6:1.5:1.5, 6:2:2, 6:2.5:2.5, 7:0.5:0.5, 7:0.5:1, 7:1:0.5, 7:1:1, 7:1.5:1.5, 7:2:2, 7:2:2.5, 7:2.5:2.5, 8:0.5:0.5, 8:0.5:1, 8:1:0.5, 8:1:1, 8:1.5:1.5, 8:1.5:2, 8:2:2, 8:2.5:2.5, 9:0.5:0.5, 9:0.5:1, 9:1:1, 9:1.5:1.5, 9:1:1.5, 9:2:2, 9:2.5:2.5 and the like, preferably 6-8:1-2:1-2.

The nickel salt, cobalt salt and aluminium salt in step (1') of the co-precipitation of the core material precursor have a metal element molar ratio of 6-9:0-2.5:0-2.5, including 0, e.g. 6:0:0, 6:0.5:0.5, 6:0.5:1, 6:2:1.5, 6:1:1, 6:1.5:1.5, 6:2:2, 6:2.5:2.5, 7:0.5:0.5, 7:0.5:1, 7:1:0.5, 7:1:1, 7:1.5:1.5, 7:2:2, 7:2:2.5, 7:2.5:2.5, 8:0.5:0.5, 8:0.5:1, 8:1:0.5, 8:1:1, 8:1.5:1.5, 8:1.5:2, 8:2:2, 8:2.5:2.5, 9:0.5:0.5, 9:0.5:1, 9:1:1, 9:1.5:1.5, 9:1:1.5, 9:2:2, 9:2.5:2.5 and the like, preferably 6-8:1-2:1-2.

Each component of the solution(s) formulated in step (1) and/or step (1') of the co-precipitation of the core material precursor has a concentration of 1-3 mol/L, e.g. 1 mol/L, 1.1 mol/L, 1.2 mol/L, 1.3 mol/L, 1.4 mol/L, 1.5 mol/L, 1.6 mol/L, 1.7 mol/L, 1.8 mol/L, 1.9 mol/L, 2 mol/L, 2.1 mol/L, 2.2 mol/L, 2.3 mol/L, 2.4 mol/L, 2.5 mol/L, 2.6 mol/L, 2.7 mol/L, 2.8 mol/L, 2.9 mol/L, 3 mol/L and the like, preferably 2 mol/L.

The precipitator in step (2) of the co-precipitation of the core material precursor is anyone selected from the group consisting of sodium hydroxide, sodium carbonate, sodium bicarbonate, ammonium carbonate and ammonium bicarbonate, or a combination of at least two selected therefrom. The typical but non-limitative examples of the combination are selected from the group consisting of the combination of sodium hydroxide and sodium carbonate, the combination of sodium carbonate and sodium bicarbonate, the combination of sodium bicarbonate and ammonium carbonate, the combination of ammonium carbonate and ammonium bicarbonate, the combination of sodium carbonate, sodium bicarbonate and ammonium carbonate, the combination of sodium carbonate, sodium bicarbonate, ammonium carbonate and ammonium bicarbonate and the like.

The carbonate precipitator in step (2) of the co-precipitation of the core material precursor is anyone selected from the group consisting of sodium carbonate, sodium bicarbonate, ammonium carbonate and ammonium bicarbonate, or a combination of at least two selected therefrom. The typical but non-limitative examples of the combination are selected from the group consisting of the combination of sodium carbonate and sodium bicarbonate, the combination of sodium bicarbonate and ammonium carbonate, the combination of ammonium carbonate and ammonium bicarbonate, the combination of sodium carbonate, sodium bicarbonate and ammonium carbonate, the combination of sodium bicarbonate, ammonium carbonate and ammonium bicarbonate, the combination of sodium carbonate, sodium bicarbonate, ammonium carbonate and ammonium bicarbonate, preferably sodium carbonate.

The ammonia in step (2) of the co-precipitation of the core material precursor is added in an amount of making the ammonia concentration in the mixed solution be 0.2-0.5 mol/L, e.g. 0.2 mol/L, 0.25 mol/L, 0.3 mol/L, 0.35 mol/L, 0.4 mol/L, 0.45 mol/L, 0.5 mol/L and the like, preferably 0.2-0.4 mol/L;

The solution is pumped into the reaction still in step (3) of the co-precipitation of the core material precursor using a hydroxide precipitator at a flow rate which makes the pH of the solution in step (4) be 9-11, e.g. 9, 9.5, 10, 10.5, 11 and the like.

The solution is pumped into the reaction still in step (3) of the co-precipitation of the core material precursor using a carbonate precipitator at a flow rate which makes the pH of the solution in step (4) be 7.5-8.5, e.g. 7.5, 7.7, 7.9, 8, 8.1, 8.3, 8.5 and the like.

The constant temperature in step (4) of the co-precipitation of the core material precursor ranges from 45-55° C., e.g. 45° C., 46° C., 47° C., 48° C., 49° C., 50° C., 51° C., 52° C., 53° C., 54° C., 55° C., preferably 50° C.

The stirring rate in step (4) of the co-precipitation of the core material precursor ranges from 800-1000 r/min, e.g. 800 r/min, 810 r/min, 830 r/min, 850 r/min, 870 r/min, 890 r/min, 900 r/min, 910 r/min, 930 r/min, 950 r/min, 970 r/min, 990 r/min, 1000 r/min and the like, preferably 1000 r/min.

The co-precipitation of the shell material solution outside the core material precursor comprises the following steps:
(1) weighing in turn nickel salt, cobalt salt and manganese salt to formulate a solution; (2) weighing a precipitator to formulate a precipitator solution having a concentration of 1-3 mol/L, adding an ammonia as a complexing agent to formulate a mixed solution;
(3) pumping into a reaction still the solution in step (1) and the mixed solution in step (2) via a constant flow pump at the same time after the completion of adding dropwise the solution during the synthesis of the core material precursor by co-precipitation;
(4) controlling the flow of the two solutions in step (3) and adjusting the pH till the completion of adding dropwise the solution.

The precipitator has a concentration of 1-3 mol/L, e.g. 1 mol/L, 1.3 mol/L, 1.5 mol/L, 1.7 mol/L, 2 mol/L, 2.3 mol/L, 2.5 mol/L, 2.7 mol/L or 3 mol/L and the like.

The co-precipitation of the shell material solution outside the core material precursor comprises the following steps:
(1') weighing in turn nickel salt, cobalt salt and aluminium salt to formulate a solution;
(2) weighing a precipitator to formulate a precipitator solution having a concentration of 1-3 mol/L, adding an ammonia as a complexing agent to formulate a mixed solution;
(3) pumping into a reaction still the solution in step (1') and the mixed solution in step (2) via a constant flow pump after the completion of adding dropwise the solution during the synthesis of the core material precursor by co-precipitation;
(4) controlling the flow of the two solutions in step (3) and adjusting the pH till the completion of adding dropwise the solution.

The precipitator has a concentration of 1-3 mol/L, e.g. 1 mol/L, 1.3 mol/L, 1.5 mol/L, 1.7 mol/L, 2 mol/L, 2.3 mol/L, 2.5 mol/L, 2.7 mol/L or 3 mol/L and the like.

The nickel salt in the co-precipitation of the shell material solution is anyone selected from the group consisting of nickel chloride, nickel sulfate, nickel nitrate, nickel carbonate, nickel acetate, nickel phosphate and nickel oxalate, or a combination of at least two selected therefrom. The typical but non-limitative examples of the combination are selected from the group consisting of the combination of nickel chloride and nickel sulfate, the combination of nickel sulfate and nickel nitrate, the combination of nickel carbonate and nickel acetate, the combination of nickel acetate and nickel phosphate, the combination of nickel phosphate and nickel oxalate, the combination of nickel chloride, nickel sulfate and nickel nitrate, the combination of nickel sulfate, nickel nitrate, nickel carbonate and nickel acetate, the combination of nickel nitrate, nickel carbonate, nickel acetate, nickel phosphate and nickel oxalate.

The cobalt salt in the co-precipitation of the shell material solution is anyone selected from the group consisting of cobalt chloride, cobalt sulfate, cobalt nitrate, cobalt carbonate, cobalt acetate, cobalt phosphate and cobalt oxalate, or a combination of at least two selected therefrom. The typical but non-limitative examples of the combination are selected from the group consisting of the combination of cobalt chloride and cobalt sulfate, the combination of cobalt sulfate and cobalt nitrate, the combination of cobalt nitrate and cobalt carbonate, the combination of cobalt acetate and cobalt phosphate, the combination of cobalt acetate, cobalt phosphate and cobalt oxalate, the combination of cobalt chloride, cobalt sulfate and cobalt nitrate, the combination of cobalt nitrate, cobalt carbonate, cobalt acetate, cobalt phosphate and cobalt oxalate.

The manganese salt in the co-precipitation of the shell material solution is anyone selected from the group consisting of manganese chloride, manganese sulfate, manganese acetate, manganese nitrate, manganese carbonate and manganese oxalate, or a combination of at least two selected therefrom. The typical but non-limitative examples of the combination are selected from the group consisting of the combination of manganese chloride and manganese sulfate, the combination of manganese sulfate and manganese acetate, the combination of manganese acetate and manganese nitrate, the combination of manganese carbonate and manganese sulfate, the combination of manganese sulfate and manganese oxalate, the combination of manganese chloride, manganese sulfate and manganese acetate, the combination of manganese acetate, manganese nitrate, manganese carbonate and manganese sulfate, the combination of manganese nitrate, manganese carbonate, manganese sulfate and manganese oxalate and the like.

The aluminium salt in the co-precipitation of the shell material solution is anyone selected from the group consisting of aluminum chloride, aluminum sulfate, aluminum nitrate, aluminum carbonate, aluminum acetate, aluminum phosphate or aluminum oxalate, or a combination of at least two selected therefrom. The typical but non-limitative examples of the combination are selected from the group consisting of the combination of aluminum chloride and aluminum sulfate, the combination of aluminum sulfate and aluminum acetate, the combination of aluminum acetate and aluminum nitrate, the combination of aluminum carbonate and aluminum acetate, the combination of aluminum phosphate and aluminum oxalate, the combination of aluminum chloride, aluminum sulfate and aluminum nitrate, the combination of aluminum carbonate, aluminum acetate and aluminum phosphate, the combination of aluminum acetate, aluminum phosphate and aluminum oxalate, the combination of aluminum carbonate, aluminum acetate, aluminum phosphate and aluminum oxalate and the like.

The nickel salt, cobalt salt and manganese salt in step (1) of the co-precipitation of the shell material solution have a metal element molar ratio of 1:0-1:0-1, e.g. 1:0.1:0.1, 1:0.2: 0.2, 1:0.3:0.3, 1:0.4:0.4, 1:0.5:0.5, 1:0.6:0.6, 1:0.7:0.7, 1:0.8:0.8, 1:0.9:0.9, 1:1:1 and the like.

The nickel salt, cobalt salt and aluminium salt in step (1') of the co-precipitation of the shell material solution have a metal element molar ratio of 1:0-1:0-1, e.g. 1:0.1:0.1, 1:0.2: 0.2, 1:0.3:0.3, 1:0.4:0.4, 1:0.5:0.5, 1:0.6:0.6, 1:0.7:0.7, 1:0.8:0.8, 1:0.9:0.9, 1:1:1 and the like.

The solution(s) formulated in step (1) and/or step (1') of the co-precipitation of the shell material solution independently has a concentration of 1-3 mol/L, e.g. 1 mol/L, 1.1 mol/L, 1.2 mol/L, 1.3 mol/L, 1.4 mol/L, 1.5 mol/L, 1.6 mol/L, 1.7 mol/L, 1.8 mol/L, 1.9 mol/L, 2 mol/L, 2.1 mol/L, 2.2 mol/L, 2.3 mol/L, 2.4 mol/L, 2.5 mol/L, 2.6 mol/L, 2.7 mol/L, 2.8 mol/L, 2.9 mol/L, 3 mol/L and the like, preferably 2 mol/L.

The precipitator in step (2) of the co-precipitation of the shell material solution is anyone selected from the group consisting of sodium hydroxide, sodium carbonate, sodium bicarbonate, ammonium carbonate or ammonium bicarbonate, or a combination of at least two selected therefrom. The typical but non-limitative examples of the combination are selected from the group consisting of the combination of sodium carbonate and sodium bicarbonate, the combination of sodium bicarbonate and ammonium carbonate, the combination of ammonium carbonate and ammonium bicarbonate, the combination of sodium carbonate, sodium bicarbonate and ammonium carbonate, the combination of sodium bicarbonate, ammonium carbonate and ammonium bicarbonate, the combination of sodium carbonate, sodium bicarbonate, ammonium carbonate and ammonium bicarbonate and the like, preferably sodium carbonate.

The ammonia in step (2) of the co-precipitation of the shell material solution is added in an amount of making the ammonia concentration in the mixed solution be 0.2-0.5 mol/L, e.g. 0.2 mol/L, 0.25 mol/L, 0.3 mol/L, 0.35 mol/L, 0.4 mol/L, 0.45 mol/L, 0.5 mol/L, preferably 0.2-0.4 mol/L.

The solution is pumped into the reaction still in step (3) of the co-precipitation of the shell material solution using a hydroxide precipitator at a flow rate which makes the pH of the solution in step (4) be 9-11, e.g. 9, 9.5, 10, 10.5, 11 and the like.

The solution is pumped into the reaction still in step (3) of the co-precipitation of the shell material solution using a carbonate precipitator at a flow rate which makes the pH of the solution in step (4) be 7.5-8.5, e.g. 7.5, 7.7, 7.9, 8, 8.1, 8.3, 8.5 and the like.

The temperature, stirring rate and pH during the process of adding dropwise the solution in step (4) of the co-precipitation of the shell material solution are the same as those during the process of the co-precipitation of the core material precursor, which can maintain the stability of the whole environmental system. After the completion of adding dropwise such coating solution, an integrated co-precipitation process continues to be completed, including the ageing.

In step (1) of the process for preparing the cathode material for nickel lithium ion battery, the aging in step (1) lasts for 12-15 h, e.g. 12 h, 12.5 h, 13 h, 13.5 h, 14 h, 14.5 h, 15 h and the like.

The aging temperature in step (1) of the process for preparing the cathode material for nickel lithium ion battery ranges from 45-55° C., e.g. 45° C., 46° C., 47° C., 48° C., 49° C., 50° C., 51° C., 52° C., 53° C., 54° C., 55° C. and the like, preferably 50° C.

The lithium source in step (2) is anyone selected from the group consisting of lithium hydroxide, lithium carbonate, lithium nitrate, lithium oxalate, lithium formate, lithium bromide, lithium citrate and lithium chloride, or a combination of at least two selected therefrom. The typical but non-limitative examples of the combination are selected from the group consisting of the combination of lithium hydroxide and lithium carbonate, the combination of lithium carbonate and lithium nitrate, the combination of lithium nitrate and lithium oxalate, the combination of lithium oxalate and lithium formate, the combination of lithium formate and lithium bromide, the combination of lithium bromide and lithium citrate, the combination of lithium citrate and lithium chloride, the combination of lithium hydroxide, lithium carbonate and lithium nitrate, the combination of lithium nitrate, lithium oxalate and lithium formate, the combination of lithium oxalate, lithium formate and lithium bromide, the combination of lithium bromide, lithium citrate and lithium chloride, the combination of lithium hydroxide, lithium carbonate, lithium nitrate and lithium oxalate, the combination of lithium nitrate, lithium oxalate, lithium formate and lithium bromide, the combination of lithium formate, lithium bromide, lithium citrate and lithium chloride and the like.

The lithium source and all the metal elements in the composite precursor in step (2) of the process for preparing the cathode material for nickel lithium ion battery have a molar ratio of 1-1.1:1, e.g. 1:1, 1.01:1, 1.02:1, 1.02:1, 1.04:1, 1.05:1, 1.06:1, 1.07:1, 1.08:1, 1.09:1, 1.1:1 and the like, preferably 1.02-1.05:1.

In the process for preparing the cathode material for nickel lithium ion battery, the grinding in step (2) is carried out by ball grinding.

The grinding in step (2) of the process for preparing the cathode material for nickel lithium ion battery lasts for 10-15 h, e.g. 10 h, 10.5 h, 11 h, 11.5 h, 12 h, 12.5 h, 13 h, 13.5 h, 14 h, 14.5 h, 15 h and the like, preferably 10-12 h.

In the process for preparing the cathode material for nickel lithium ion battery, the calcination in step (2) is carried out under oxygen atmosphere.

In the process for preparing the cathode material for nickel lithium ion battery, the calcination in step (2) comprises two steps of pre-calcination and calcination.

The pre-calcination is heated at an increasing rate of 5° C./min from room temperature to 400-500° C., e.g. 400° C., 410° C., 420° C., 430° C., 440° C., 450° C., 460° C., 470° C., 480° C., 490° C., 500° C. and the like, preferably 500° C.

The pre-calcination lasts for 4-6 h, e.g. 4 h, 4.5 h, 5 h, 5.5 h, 6 h and the like, preferably 5 h.

The calcination is heated at an increasing rate of 5° C./min from 500° C. to 750-950° C., e.g. 750° C., 800° C., 850° C., 900° C., 950° C. and the like, preferably 800-900° C.

The calcination lasts for 10-20 h, e.g. 10 h, 11 h, 12 h, 13 h, 14 h, 15 h, 16 h, 17 h, 18 h, 19 h, 20 h and the like, preferably 12-15 h.

The present invention further discloses a use of the cathode material for nickel lithium ion battery prepared according to the process above in the field of battery manufacturing.

As compared to the prior art, the present invention has the following beneficial effect.

During the preparation of the precursor by the co-precipitation process, the composite precursor of the core material coated with the shell material is synthesized by one-step method, to make the nickel content in the obtained material show a concentration gradient distribution, wherein the content of the nickel element in the core is high, and the content of the nickel element in the shell is less. The inner nickel element ensures the specific capacity of the material, and the outer coating material maintains the stability of the structure of the material, so as to increase the safety of the material in the charge and discharge process and improve the cycle and rate capability of the material.

From the scanning electron microscopy image of the precursor with the concentration gradient prepared by the present invention and the XRD image of the cathode material for lithium battery, it can be seen that the material has a regular morphology, a uniform coating and a narrow particle size distribution. Meanwhile, it can be seen from the electrochemical performance test and the electrochemical cycle performance test of the material prepared by the present invention that the material has a specific capacity of more than 170 mAh/g and a specific energy of 700 Wh/kg or more at 0.1 C, so as to have a better cycle performance.

EMBODIMENTS

In order to better illustrate the present invention and to better understand the technical solutions of the present invention, the typical and non-limiting examples of the present invention are described below.

Example 1

1. Synthesizing a Core Material Precursor by Co-Precipitation (1) weighing in turn $NiSO_4$, $CoSO_4$ and $MnSO_4$ according to a metal element molar ratio of 8:1:1 to formulate 200 ml of a solution having a concentration of 2 mol/L;

(2) weighing a carbonate precipitator $Na_2CO_3$ to formulate 200 ml of a solution having a concentration of 2 mol/L, and adding $NH_3.H_2O$ into the $Na_2CO_3$ solution to formulate a mixed solution, wherein $NH_3.H_2O$ had a molar concentration of 0.2 mol/L;

(3) simultaneously pumping the two solutions in steps (1) and (2) into a reaction still via a constant flow pump;

(4) adjusting the pH to 8 by controlling the flow of the two solutions, stirring at a constant temperature of 50° C. and a rate of 1000 r/min till the completion of adding dropwise the solution.

Figure 1:
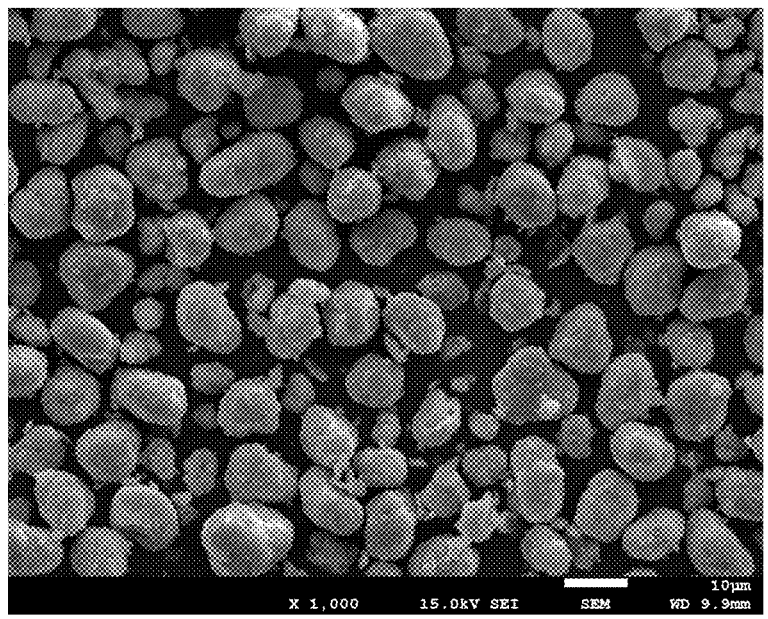
FIG. 1 shows the scanning electron microscopy image of the precursor with a concentration gradient obtained in Example 1 of the present invention.
Figure 2:
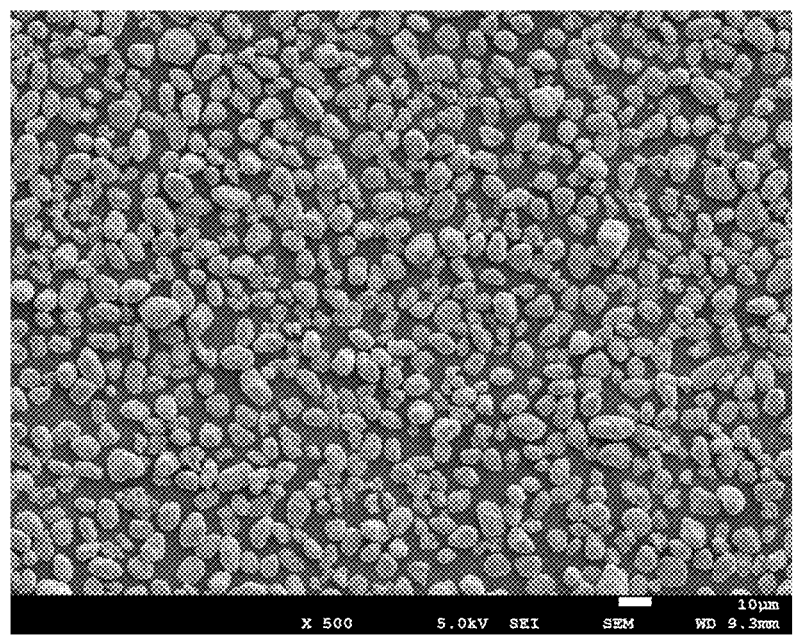
FIG. 2 shows the scanning electron microscopy image of the precursor with a concentration gradient obtained in Example 1 of the present invention.
Figure 3:
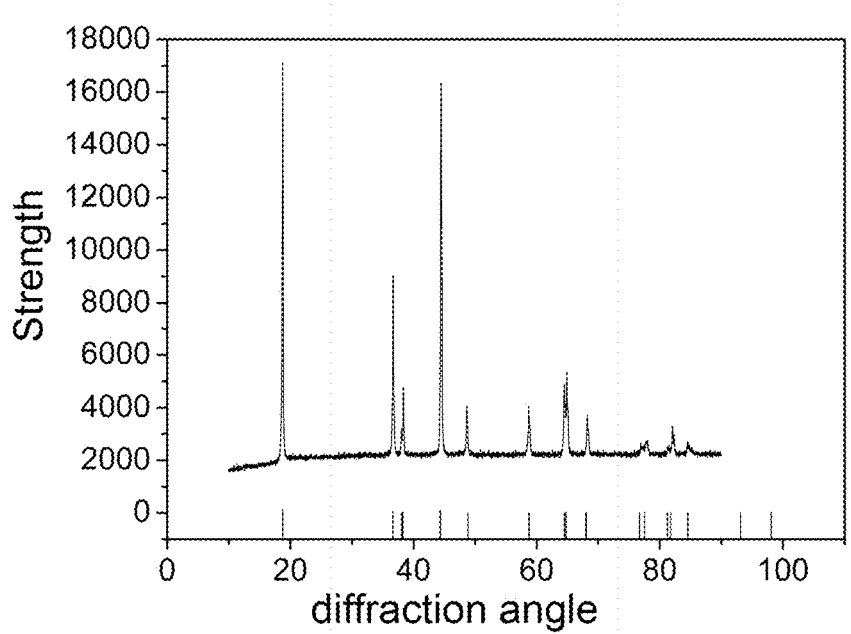
FIG. 3 shows the XRD image of the cathode material for lithium battery with a concentration gradient obtained in Example 1 of the present invention.

2. Co-Precipitating a Shell Material Solution Outside the Core Material Precursor (1) weighing in turn $NiSO_4$, $CoSO_4$ and $MnSO_4$ according to a metal element molar ratio of 1:1:1 to formulate 50 ml of a solution having a concentration of 2 mol/L;

(2) weighing a carbonate precipitator $Na_2CO_3$ to formulate 50 ml of a solution having a concentration of 2 mol/L, and adding $NH_3 \cdot H_2O$ into the $Na_2CO_3$ solution to formulate a mixed solution, wherein $NH_3 \cdot H_2O$ had a molar concentration of 0.2 mol/L;

(3) simultaneously pumping the solution in step (1) and the mixed solution in step (2) into a reaction still via a constant flow pump after the completion of adding dropwise the solution in the process of synthesizing the core material precursor by co-precipitation;

(4) adjusting the pH to 8 by controlling the flow of the two solutions, stirring at a constant temperature of 50° C. and a rate of 1000 r/min till the completion of adding dropwise the solution, maintaining a constant temperature of 50° C., aging for 12 hours, filtering, washing and drying to obtain a composite precursor having a concentration gradient;

3. Weighing lithium carbonate and the composite precursor according to a molar ratio of lithium to all the metal elements in the composite precursor of 1.02:1, mixing and ball grinding for 10 h, then heating under oxygen atmosphere from room temperature to 500° C. at an increasing rate of 5° C./min, pre-calcining for 5 h, then heating to 800° C. at the same rate, calcining for 15 h and naturally cooling to obtain a cathode material for lithium battery having a concentration gradient (as shown in FIGS. 1-3).

Figure 4:
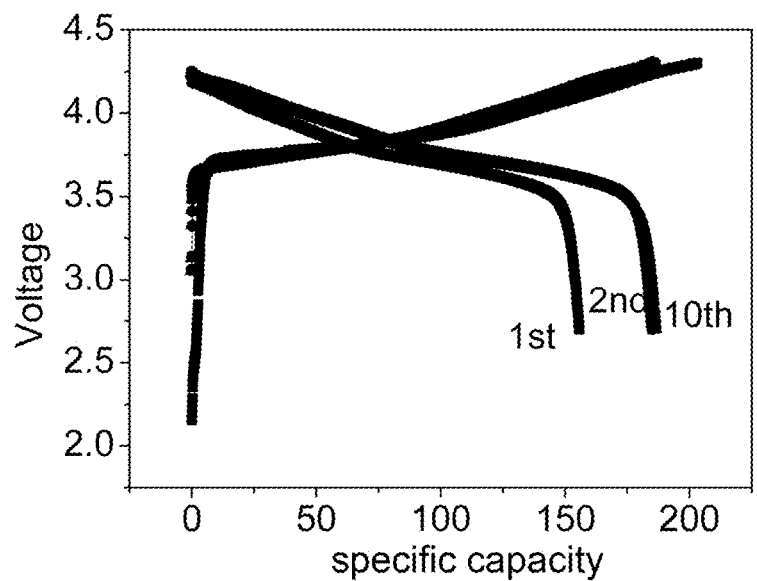
FIG. 4 shows the electrochemical performance test image of the cathode material for lithium battery with a concentration gradient obtained in Example 1 of the present invention.

The obtained material was coated and assembled into a button battery for electrochemical test (shown in FIG. 4). The obtained material had a specific capacity of 180 mAh/g and a specific energy of 720 Wh/kg at 0.1 C, and a reversible capacity of 170 mAh/g after 100 cycles, and good cycle performance.

Example 2

1. Synthesizing a Core Material Precursor by Co-Precipitation (1) weighing in turn $NiSO_4$, $CoSO_4$ and $Al_2(SO_4)_3$ according to a metal element molar ratio of 8:1:1 to formulate 200 ml of a solution having a concentration of 2 mol/L;

(2) weighing a hydroxide precipitator NaOH to formulate 200 ml of a solution having a concentration of 2 mol/L, and adding $NH_3 \cdot H_2O$ into the NaOH solution to formulate a mixed solution, wherein $NH_3 \cdot H_2O$ had a molar concentration of 0.2 mol/L;

(3) simultaneously pumping the two solutions in steps (1) and (2) into a reaction still via a constant flow pump;

(4) adjusting the pH to 11 by controlling the flow of the two solutions, stirring at a constant temperature of 50° C. and a rate of 1000 r/min till the completion of adding dropwise the solution.

2. Co-Precipitating a Shell Material Solution Outside the Core Material Precursor (1) weighing in turn $NiSO_4$, $CoSO_4$ and $Al_2(SO_4)_3$ according to a metal element molar ratio of 1:1:1 to formulate 20 ml of a solution having a concentration of 2 mol/L;

(2) weighing a hydroxide precipitator NaOH to formulate 20 ml of a solution having a concentration of 2 mol/L, and adding $NH_3 \cdot H_2O$ into the NaOH solution to formulate a mixed solution, wherein $NH_3 \cdot H_2O$ had a molar concentration of 0.2 mol/L;

(3) simultaneously pumping the solution in step (1) and the mixed solution in step (2) into a reaction still via a constant flow pump after the completion of adding dropwise the solution in the process of synthesizing the core material precursor by co-precipitation;

(4) adjusting the pH to 11 by controlling the flow of the two solutions, stirring at a constant temperature of 50° C. and a rate of 1000 r/min till the completion of adding dropwise the solution, maintaining a constant temperature of 50° C., aging for 12 hours, filtering, washing and drying to obtain a composite precursor having a concentration gradient;

3. Weighing lithium hydroxide and the composite precursor according to a molar ratio of lithium to all the metal elements in the composite precursor of 1.02:1, mixing and ball grinding for 10 h, then heating under oxygen atmosphere from room temperature to 500° C. at an increasing rate of 5° C./min, pre-calcining for 5 h, then heating to 850° C. at the same rate, calcining for 15 h and naturally cooling to obtain a cathode material for lithium battery having a concentration gradient.

Figure 5:
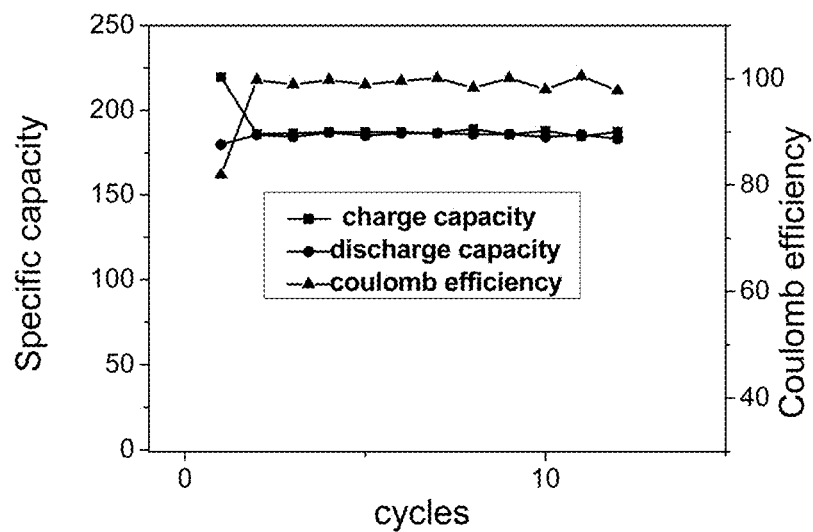
FIG. 5 shows the electrochemical cycle performance test image of the cathode material for lithium battery with a concentration gradient obtained in Example 2 of the present invention.

The obtained material was coated and assembled into a button battery for electrochemical test. The obtained material had a specific capacity of 190 mAh/g and a specific energy of 760 Wh/kg at 0.1 C, and good cycle performance (as shown in FIG. 5).

Example 3

1. Synthesizing a Core Material Precursor by Co-Precipitation (1) weighing in turn $NiCl_2$, $CoCl_2$, $MnCl_2$ according to a metal element molar ratio of 6:2:2 to formulate 200 ml of a solution having a concentration of 2 mol/L;

(2) weighing a hydroxide precipitator NaOH to formulate 200 ml of a solution having a concentration of 2 mol/L, and adding $NH_3 \cdot H_2O$ into the NaOH solution to formulate a mixed solution, wherein $NH_3 \cdot H_2O$ had a molar concentration of 0.4 mol/L;

(3) simultaneously pumping the two solutions in steps (1) and (2) into a reaction still via a constant flow pump;

(4) adjusting the pH to 11 by controlling the flow of the two solutions, stirring at a constant temperature of 50° C. and a rate of 1000 r/min till the completion of adding dropwise the solution.

2. Co-Precipitating a Shell Material Solution Outside the Core Material Precursor (1) weighing in turn $NiSO_4$, $CoSO_4$ and $Al_2(SO_4)_3$ according to a metal element molar ratio of 1:1:1 to formulate 40 ml of a solution having a concentration of 2 mol/L;

(2) weighing a hydroxide precipitator NaOH to formulate 40 ml of a solution having a concentration of 2 mol/L, and adding $NH_3 \cdot H_2O$ into the NaOH solution to formulate a mixed solution, wherein $NH_3 \cdot H_2O$ had a molar concentration of 0.2 mol/L;

(3) simultaneously pumping the solution in step (1) and the mixed solution in step (2) into a reaction still via a constant flow pump after the completion of adding dropwise the solution in the process of synthesizing the core material precursor by co-precipitation;

(4) adjusting the pH to 11 by controlling the flow of the two solutions, stirring at a constant temperature of 50° C. and a rate of 1000 r/min till the completion of adding dropwise the solution, maintaining a constant temperature of 50° C., aging for 12 hours, filtering, washing and drying to obtain a composite precursor having a concentration gradient;

3. Weighing lithium nitrate and the composite precursor according to a molar ratio of lithium to all the metal elements in the composite precursor of 1.02:1, mixing and ball grinding for 10 h, then heating under oxygen atmosphere from room temperature to 500° C. at an increasing rate of 5° C./min, pre-calcining for 5 h, then heating to 900° C. at the same rate, calcining for 12 h and naturally cooling to obtain a cathode material for lithium battery having a concentration gradient.

The obtained material was coated and assembled into a button battery for electrochemical test. The obtained material had a specific capacity of 175 mAh/g and a specific energy of 685 Wh/kg at 0.1 C.

Example 4

1. Synthesizing a Core Material Precursor by Co-Precipitation (1) weighing $NiSO_4$ to formulate 200 ml of a solution having a concentration of 2 mol/L;

(2) weighing a carbonate precipitator $Na_2CO_3$ to formulate 200 ml of a solution having a concentration of 2 mol/L, and adding $NH_3 \cdot H_2O$ into the $Na_2CO_3$ solution to formulate a mixed solution, wherein $NH_3 \cdot H_2O$ had a molar concentration of 0.2 mol/L;

(3) simultaneously pumping the two solutions in steps (1) and (2) into a reaction still via a constant flow pump;

(4) adjusting the pH to 8 by controlling the flow of the two solutions, stirring at a constant temperature of 50° C. and a rate of 1000 r/min till the completion of adding dropwise the solution.

2. Co-Precipitating a Shell Material Solution Outside the Core Material Precursor (1) weighing in turn $NiSO_4$, $CoSO_4$, $MnSO_4$ according to a metal element molar ratio of 1:1:1 to formulate 100 ml of a solution having a concentration of 2 mol/L;

(2) weighing a carbonate precipitator $Na_2CO_3$ to formulate 100 ml of a solution having a concentration of 2 mol/L, and adding $NH_3 \cdot H_2O$ into the $Na_2CO_3$ solution to formulate a mixed solution, wherein $NH_3 \cdot H_2O$ had a molar concentration of 0.2 mol/L;

(3) simultaneously pumping the solution in step (1) and the mixed solution in step (2) into a reaction still via a constant flow pump after the completion of adding dropwise the solution in the process of synthesizing the core material precursor by co-precipitation;

(4) adjusting the pH to 8 by controlling the flow of the two solutions, stirring at a constant temperature of 50° C. and a rate of 1000 r/min till the completion of adding dropwise the solution, maintaining a constant temperature of 50° C., aging for 15 hours, filtering, washing and drying to obtain a composite precursor having a concentration gradient;

3. Weighing lithium carbonate and the composite precursor according to a molar ratio of lithium to all the metal elements in the composite precursor of 1.02:1, mixing and ball grinding for 10 h, then heating under oxygen atmosphere from room temperature to 500° C. at an increasing rate of 5° C./min, pre-calcining for 5 h, then heating to 800° C. at the same rate, calcining for 12 h and naturally cooling to obtain a cathode material for lithium battery having a concentration gradient.

The obtained material was coated and assembled into a button battery for electrochemical test. The obtained material had a specific capacity of 210 mAh/g and a specific energy of 824 Wh/kg at 0.1 C.

Example 5

This Example is an Enlarge Test

1. Synthesizing a Core Material Precursor by Co-Precipitation (1) weighing in turn $NiSO_4$, $CoSO_4$, $MnSO_4$ according to a metal element molar ratio of 9:0.5:0.5 to formulate 2 L of a solution having a concentration of 2 mol/L;

(2) weighing a carbonate precipitator $Na_2CO_3$ to formulate 2 L of a solution having a concentration of 2 mol/L, and adding $NH_3 \cdot H_2O$ into the $Na_2CO_3$ solution to formulate a mixed solution, wherein $NH_3 \cdot H_2O$ had a molar concentration of 0.4 mol/L;

(3) simultaneously pumping the two solutions in steps (1) and (2) into a reaction still via a constant flow pump;

(4) adjusting the pH to 8 by controlling the flow of the two solutions, stirring at a constant temperature of 50° C. and a rate of 1000 r/min till the completion of adding dropwise the solution.

2. Co-Precipitating a Shell Material Solution Outside the Core Material Precursor (1) weighing in turn $NiSO_4$, $CoSO_4$, $MnSO_4$ according to a metal element molar ratio of 1:1:1 to formulate 100 ml of a solution having a concentration of 2 mol/L;

(2) weighing a carbonate precipitator $Na_2CO_3$ to formulate 100 ml of a solution having a concentration of 2 mol/L, and adding $NH_3 \cdot H_2O$ into the $Na_2CO_3$ solution to formulate a mixed solution, wherein $NH_3 \cdot H_2O$ had a molar concentration of 0.4 mol/L;

(3) simultaneously pumping the solution in step (1) and the mixed solution in step (2) into a reaction still via a constant flow pump after the completion of adding dropwise the solution in the process of synthesizing the core material precursor by co-precipitation;

(4) adjusting the pH to 8 by controlling the flow of the two solutions, stirring at a constant temperature of 50° C. and a rate of 1000 r/min till the completion of adding dropwise the solution, maintaining a constant temperature of 50° C., aging for 12 hours, filtering, washing and drying to obtain a composite precursor having a concentration gradient;

3. Weighing lithium nitrate and the composite precursor according to a molar ratio of lithium to all the metal elements in the composite precursor of 1.05:1, mixing and ball grinding for 12 h, then heating under oxygen atmosphere from room temperature to 500° C. at an increasing rate of 5° C./min, pre-calcining for 5 h, then heating to 850° C. at the same rate, calcining for 15 h and naturally cooling to obtain a cathode material for lithium battery having a concentration gradient.

The obtained material was coated and assembled into a button battery for electrochemical test. The obtained material had a specific capacity of 195 mAh/g and a specific energy of 775 Wh/kg at 0.1 C.

Example 6

1. Synthesizing a Core Material Precursor by Co-Precipitation (1) weighing in turn $Ni_3(PO_4)_2$, $Co_3(PO_4)_2$, $Mn_3(PO_4)_2$ according to a metal element molar ratio of 5:2.5:2.5 to formulate 230 ml of a solution having a concentration of 2.5 mol/L;

(2) weighing a hydroxide precipitator NaOH to formulate 230 ml of a solution having a concentration of 2.5 mol/L, and adding $NH_3 \cdot H_2O$ into the NaOH solution to formulate a mixed solution, wherein $NH_3 \cdot H_2O$ had a molar concentration of 0.5 mol/L;

(3) simultaneously pumping the two solutions in steps (1) and (2) into a reaction still via a constant flow pump;

(4) adjusting the pH to 9 by controlling the flow of the two solutions, stirring at a constant temperature of 55° C. and a rate of 900 r/min till the completion of adding dropwise the solution.

2. Co-Precipitating a Shell Material Solution Outside the Core Material Precursor (1) weighing in turn $Ni_3(PO_4)_2$, $Co_3(PO_4)_2$, $Mn_3(PO_4)_2$ according to a metal element molar ratio of 1:1:1 to formulate 60 ml of a solution having a concentration of 2.5 mol/L;
(2) weighing a hydroxide precipitator NaOH to formulate 60 ml of a solution having a concentration of 2.5 mol/L, and adding $NH_3.H_2O$ into the NaOH solution to formulate a mixed solution, wherein $NH_3.H_2O$ had a molar concentration of 0.5 mol/L;
(3) simultaneously pumping the solution in step (1) and the mixed solution in step (2) into a reaction still via a constant flow pump after the completion of adding dropwise the solution in the process of synthesizing the core material precursor by co-precipitation;
(4) adjusting the pH to 9 by controlling the flow of the two solutions, stirring at a constant temperature of 55° C. and a rate of 900 r/min till the completion of adding dropwise the solution, maintaining a constant temperature of 55° C., aging for 13 hours, filtering, washing and drying to obtain a composite precursor having a concentration gradient;
3. Weighing lithium citrate and the composite precursor according to a molar ratio of lithium to all the metal elements in the composite precursor of 1.07:1, mixing and ball grinding for 15 h, then heating under oxygen atmosphere from room temperature to 450° C. at an increasing rate of 5° C./min, pre-calcining for 4 h, then heating to 950° C. at the same rate, calcining for 10 h and naturally cooling to obtain a cathode material for lithium battery having a concentration gradient.

The obtained material was coated and assembled into a button battery for electrochemical test. The obtained material had a specific capacity of 173 mAh/g and a specific energy of 658 Wh/kg at 0.1 C.

Example 7

1. Synthesizing a Core Material Precursor by Co-Precipitation (1) weighing in turn nickel acetate, cobalt acetate and aluminum acetate according to a metal element molar ratio of 7:1.5:1.5 to formulate 250 ml of a solution having a concentration of 3 mol/L;
(2) weighing a hydroxide precipitator NaOH to formulate 250 ml of a solution having a concentration of 3 mol/L, and adding $NH_3.H_2O$ into the NaOH solution to formulate a mixed solution, wherein $NH_3.H_2O$ had a molar concentration of 0.3 mol/L;
(3) simultaneously pumping the two solutions in steps (1) and (2) into a reaction still via a constant flow pump;
(4) adjusting the pH to 10 by controlling the flow of the two solutions, stirring at a constant temperature of 45° C. and a rate of 800 r/min till the completion of adding dropwise the solution.
2. Co-Precipitating a Shell Material Solution Outside the Core Material Precursor (1) weighing in turn nickel acetate, cobalt acetate and aluminum acetate according to a metal element molar ratio of 1:1:1 to formulate 50 ml of a solution having a concentration of 3 mol/L;
(2) weighing a hydroxide precipitator NaOH to formulate 50 ml of a solution having a concentration of 3 mol/L, and adding $NH_3.H_2O$ into the NaOH solution to formulate a mixed solution, wherein $NH_3.H_2O$ had a molar concentration of 0.3 mol/L;
(3) simultaneously pumping the solution in step (1) and the mixed solution in step (2) into a reaction still via a constant flow pump after the completion of adding dropwise the solution in the process of synthesizing the core material precursor by co-precipitation;
(4) adjusting the pH to 10 by controlling the flow of the two solutions, stirring at a constant temperature of 45° C. and a rate of 800 r/min till the completion of adding dropwise the solution, maintaining a constant temperature of 45° C., aging for 12 hours, filtering, washing and drying to obtain a composite precursor having a concentration gradient;
3. Weighing lithium bromide and the composite precursor according to a molar ratio of lithium to all the metal elements in the composite precursor of 1.1:1, mixing and ball grinding for 15 h, then heating under oxygen atmosphere from room temperature to 400° C. at an increasing rate of 5° C./min, pre-calcining for 6 h, then heating to 750° C. at the same rate, calcining for 20 h and naturally cooling to obtain a cathode material for lithium battery having a concentration gradient.

The obtained material was coated and assembled into a button battery for electrochemical test. The obtained material had a specific capacity of 180 mAh/g and a specific energy of 703 Wh/kg at 0.1 C.

Example 8

1. Synthesizing a Core Material Precursor by Co-Precipitation (1) weighing in turn nickel oxalate, cobalt oxalate and aluminum oxalate according to a metal element molar ratio of 8:1:1 to formulate 200 ml of a solution having a concentration of 2 mol/L;
(2) weighing a carbonate precipitator $Na_2CO_3$ to formulate 200 ml of a solution having a concentration of 2 mol/L, and adding $NH_3.H_2O$ into the $Na_2CO_3$ solution to formulate a mixed solution, wherein $NH_3.H_2O$ had a molar concentration of 0.2 mol/L;
(3) simultaneously pumping the two solutions in steps (1) and (2) into a reaction still via a constant flow pump;
(4) adjusting the pH to 8.5 by controlling the flow of the two solutions, stirring at a constant temperature of 50° C. and a rate of 850 r/min till the completion of adding dropwise the solution.
2. Co-Precipitating a Shell Material Solution Outside the Core Material Precursor (1) weighing in turn nickel oxalate, cobalt oxalate and aluminum oxalate according to a metal element molar ratio of 1:1:1 to formulate 30 ml of a solution having a concentration of 2 mol/L;
(2) weighing a carbonate precipitator $Na_2CO_3$ to formulate 30 ml of a solution having a concentration of 2 mol/L, and adding $NH_3.H_2O$ into the $Na_2CO_3$ solution to formulate a mixed solution, wherein $NH_3.H_2O$ had a molar concentration of 0.2 mol/L;
(3) simultaneously pumping the solution in step (1) and the mixed solution in step (2) into a reaction still via a constant flow pump after the completion of adding dropwise the solution in the process of synthesizing the core material precursor by co-precipitation;
(4) adjusting the pH to 8.5 by controlling the flow of the two solutions, stirring at a constant temperature of 50° C. and a rate of 850 r/min till the completion of adding dropwise the solution, maintaining a constant temperature of 50° C., aging for 13 hours, filtering, washing and drying to obtain a composite precursor having a concentration gradient;
3. Weighing lithium formate and the composite precursor according to a molar ratio of lithium to all the metal elements in the composite precursor of 1:1, mixing and ball grinding for 13 h, then heating under oxygen atmosphere from room temperature to 500° C. at an increasing rate of 5° C./min, pre-calcining for 6 h, then heating to 850° C. at the same rate, calcining for 14 h and naturally cooling to obtain a cathode material for lithium battery having a concentration gradient.

The obtained material was coated and assembled into a button battery for electrochemical test. The obtained material had a specific capacity of 180 mAh/g and a specific energy of 720 Wh/kg at 0.1 C.

Example 9

1. Synthesizing a Core Material Precursor by Co-Precipitation
(1) weighing in turn nickel oxalate and cobalt oxalate according to a metal element molar ratio of 7:2 to formulate 200 ml of a solution having a concentration of 2 mol/L;
(2) weighing a carbonate precipitator $Na_2CO_3$ to formulate 200 ml of a solution having a concentration of 2 mol/L, and adding $NH_3 \cdot H_2O$ into the $Na_2CO_3$ solution to formulate a mixed solution, wherein $NH_3 \cdot H_2O$ had a molar concentration of 0.2 mol/L;
(3) simultaneously pumping the two solutions in steps (1) and (2) into a reaction still via a constant flow pump;
(4) adjusting the pH to 7.5 by controlling the flow of the two solutions, stirring at a constant temperature of 50° C. and a rate of 850 r/min till the completion of adding dropwise the solution.

2. Co-Precipitating a Shell Material Solution Outside the Core Material Precursor
(1) weighing in turn nickel oxalate, cobalt oxalate and manganese oxalate according to a metal element molar ratio of 1:1:1 to formulate 30 ml of a solution having a concentration of 2 mol/L;
(2) weighing a carbonate precipitator $Na_2CO_3$ to formulate 30 ml of a solution having a concentration of 2 mol/L, and adding $NH_3 \cdot H_2O$ into the $Na_2CO_3$ solution to formulate a mixed solution, wherein $NH_3 \cdot H_2O$ had a molar concentration of 0.2 mol/L;
(3) simultaneously pumping the solution in step (1) and the mixed solution in step (2) into a reaction still via a constant flow pump after the completion of adding dropwise the solution in the process of synthesizing the core material precursor by co-precipitation;
(4) adjusting the pH to 7.5 by controlling the flow of the two solutions, stirring at a constant temperature of 50° C. and a rate of 850 r/min till the completion of adding dropwise the solution, maintaining a constant temperature of 50° C.,
aging for 13 hours, filtering, washing and drying to obtain a composite precursor having a concentration gradient;

3. Weighing lithium formate, lithium bromide and the composite precursor according to a molar ratio of lithium to all the metal elements in the composite precursor of 1:1, mixing and ball grinding for 13 h, then heating under oxygen atmosphere from room temperature to 500° C. at an increasing rate of 5° C./min, pre-calcining for 5 h, then heating to 850° C. at the same rate, calcining for 14 h and naturally cooling to obtain a cathode material for lithium battery having a concentration gradient.

The obtained material was coated and assembled into a button battery for electrochemical test. The obtained material had a specific capacity of 176 mAh/g and a specific energy of 680 Wh/kg at 0.1 C.

Example 10

Except for weighing nickel oxalate and manganese oxalate according to a metal element molar ratio of 7:2 in the process of synthesizing a core material precursor by co-precipitation, other steps were the same as those in Example 1.

The obtained material was coated and assembled into a button battery for electrochemical test. The obtained material had a specific capacity of 176 mAh/g and a specific energy of 680 Wh/kg at 0.1 C.

Comparison Example 1

Except for not carrying out the process of co-precipitating low-nickel ternary material solution outside the core material precursor, other steps were the same as those in Example 1.

The obtained material was coated and assembled into a button battery for electrochemical test. The obtained material had a specific capacity of 186 mAh/g at 0.1 C, and a reversible capacity of 140 mAh/g after 100 cycles which showed a poor cycle performance.

Comparison Example 2

Except for synthesizing a low-nickel ternary material precursor directly by precipitation, rather than synthesizing a core material precursor by co-precipitation, other steps were the same as those in Example 1.

The obtained material was coated and assembled into a button battery for electrochemical test. The obtained material had a specific capacity of 105 mAh/g and a specific energy of 405 Wh/kg at 0.1 C.

The performance test results of the materials prepared in Examples 1-10 and Comparison Examples 1-2 are listed in Table 1 below.

TABLE 1

The performance test results of the materials prepared in Examples 1-10 and Comparison Examples 1-2

| 0.1 C | Examples | | | | | | | | | | Comparison Examples | |
|---|---|---|---|---|---|---|---|---|---|---|---|---|
| | 1 | 2 | 3 | 4 | 5 | 6 | 7 | 8 | 9 | 10 | 1 | 2 |
| Specific capacity mAh/g | 180 | 190 | 175 | 210 | 195 | 173 | 180 | 180 | 176 | 176 | 186 | 105 |
| Specific energy Wh/kg | 720 | 760 | 685 | 824 | 775 | 658 | 703 | 720 | 680 | 680 | 727 | 405 |

The results in Examples 1 to 10 and Comparison Examples 1-2 show that the prepared material has a specific capacity of more than 170 mAh/g and a specific energy of 700 Wh/kg or more at 0.1 C. The synthesis of the composite precursor in which the core material is coated with the shell material by one-step method makes the nickel element in the obtained material show a concentration gradient distribution, wherein the content of the nickel element in the core is high, and the content of the nickel element in the shell is less. The inner nickel element ensures the specific capacity of the material, and the outer coating material maintains the stability of the structure of the material, which solves the problems of insufficient high-nickel-lithium battery materials, safety, electrochemical cycle and magnification, increases the safety of the material in the charge and discharge process and improves the cycle and rate capability of the material.

The applicant claims that the present invention describes the process of the present invention in details, but the present invention is not limited to the above detailed process. That is to say, it does not means that the present invention shall be carried out with respect to the above-described process. Those skilled in the art shall know that any improvements to the present invention, equivalent replacements of the raw materials of the present invention, additions of auxiliary ingredients, selections of specific ways and the like all fall within the protection scope and disclosure scope of the present invention.

The invention claimed is:

1. A process for preparing a cathode material for nickel lithium ion battery with a concentration gradient, where the material is a core-shell material with a concentration gradient, wherein the core material has the structural formula of $LiNi_xM_yO_2$, wherein $0.5 \leq x \leq 1$, $0 \leq y \leq 0.5$, $x+y=1$, $M=Co_\alpha Mn_\beta$, $0 \leq \alpha \leq 1$, $0 \leq \beta \leq 1$, $\alpha+\beta=y$, and/or the structural formula of $LiNi_xM_yO_2$, wherein $0.5 \leq x \leq 1$, $0 \leq y \leq 0.5$, $x+y=1$, $M=Co_\alpha Al_\beta$, $0 \leq \alpha \leq 1$, $0 \leq \beta \leq 1$, $\alpha+\beta=y$, wherein the shell material is a nickel-containing ternary material having the structural formula of $LiNi_xCo_yMn_zO_2$, wherein $0<x\leq0.5$, $0<y\leq1$, $0<z\leq1$, $x+y+z=1$, and/or the structural formula of $LiNi_xCo_yAl_zO_2$, wherein $0<x\leq0.5$, $0<y\leq1$, $0<z\leq1$, $x+y+z=1$, wherein the core material has an average particle size of 5-15 μm and the shell material has an average thickness of 1-5 μm, and wherein the process comprises the steps of:

(1) synthesizing a precursor of the core material by co-precipitation, then co-precipitating a shell material solution outside the core material precursor, aging, washing and drying to obtain a composite precursor in which the core material is coated with the shell material, wherein the aging lasts for 12-15 hours and the aging temperature ranges from 45-55° C.; and (2) adding a lithium source into the composite precursor, grinding and mixing, calcining and cooling to prepare a cathode material for nickel lithium ion battery, wherein the calcination comprises two steps of pre-calcination and calcination where the pre-calcination is heated at an increasing rate of 5° C./min from room temperature to 400-500° C. and the pre-calcination lasts for 4-6 hours, and the calcination is heated at an increasing rate of 5° C./min from 500° C. to 750-950° C. and the calcination lasts for 10-20 hours, and wherein the co-precipitation of the core material precursor comprises the following steps:

(a) weighing in turn nickel salt, cobalt salt and manganese salt to formulate a solution after mixing;

(b) weighing a precipitator to formulate a precipitator solution having a concentration of 1-3 mol/L and then adding ammonia as a complexing agent to formulate a mixed solution, wherein the ammonia is added in an amount to achieve an ammonia concentration in the mixed solution in the range of 0.2-0.5 mol/L;

(c) pumping into a reaction still the solution in step (a) and the mixed solution in step (b) via a constant flow pump; and (d) controlling the flow of the two solutions in step (c) and adjusting the pH to be in the range of 7.5-8.5, stirring at 800-1000 r/min under constant temperature conditions of 45-55° C. until the completion of adding dropwise the solution, or wherein the co-precipitation of the core material precursor comprises the following steps:

(a') weighing in turn nickel salt, cobalt salt and aluminum salt to formulate a solution after mixing;

(b) weighing a precipitator to formulate a precipitator solution having a concentration of 1-3 mol/L and then adding ammonia as a complexing agent to formulate a mixed solution, wherein the ammonia is added in an amount to achieve an ammonia concentration in the mixed solution in the range of 0.2-0.5 mol/L;

(c) pumping into a reaction still the solution in step (a') and the mixed solution in step (b) via a constant flow pump; and (d) controlling the flow of the two solutions in step (c) and adjusting the pH to be in the range of 7.5-8.5, stirring at 800-1000 r/min under constant temperature conditions of 45-55° C. until the completion of adding dropwise the solution, wherein the precipitator in step (b) is any one selected from the group consisting of sodium carbonate, sodium bicarbonate, ammonium carbonate and ammonium bicarbonate, or a combination of at least two selected therefrom, wherein the co-precipitation of the shell material solution outside the core material precursor comprises the following steps:

(e) weighing in turn nickel salt, cobalt salt and manganese salt to formulate a solution;

(f) weighing a precipitator to formulate a precipitator solution having a concentration of 1-3 mol/L and then adding ammonia as a complexing agent to formulate a mixed solution, wherein the ammonia is added in an amount to achieve an ammonia concentration in the mixed solution in the range of 0.2-0.5 mol/L;

(g) pumping into a reaction still the solution in step (e) and the mixed solution in step (f) via a constant flow pump at the same time after the completion of adding dropwise the solution during the synthesis of the core material precursor by co-precipitation; and (h) controlling the flow of the two solutions in step (g) and adjusting the pH to be in the range of 7.5-8.5, stirring at 800-1000 r/min under constant temperature conditions of 45-55° C. until the completion of adding dropwise the solution, or wherein the co-precipitation of the shell material solution outside the core material precursor comprises the following steps:

(e') weighing in turn nickel salt, cobalt salt and aluminum salt to formulate a solution;

(f) weighing a precipitator to formulate a precipitator solution having a concentration of 1-3 mol/L and then adding ammonia as a complexing agent to formulate a mixed solution, wherein the ammonia is added in an amount to achieve an ammonia concentration in the mixed solution in the range of 0.2-0.5 mol/L;

(g) pumping into a reaction still the solution in step (e') and the mixed solution in step (f) via a constant flow pump after the completion of adding dropwise the solution during the synthesis of the core material precursor by co-precipitation; and (h) controlling the flow of the two solutions in step (g) and adjusting the pH to be in the range of 7.5-8.5, stirring at 800-1000 r/min under constant temperature conditions of 45-55° C. till the completion of adding dropwise the solution, wherein the precipitator in step (f) is any one selected from the group consisting of sodium carbonate, sodium bicarbonate, ammonium carbonate or ammonium bicarbonate, or a combination of at least two selected therefrom.

2. The process according to claim 1, wherein the nickel salt in the co-precipitation of the core material precursor is any one selected from the group consisting of nickel chloride, nickel sulfate, nickel nitrate, nickel carbonate, nickel acetate, nickel phosphate and nickel oxalate, or a combination of at least two selected therefrom, wherein the cobalt salt in the co-precipitation of the core material precursor is any one selected from the group consisting of cobalt chloride, cobalt sulfate, cobalt nitrate, cobalt carbonate, cobalt acetate, cobalt phosphate and cobalt oxalate, or a combination of at least two selected therefrom, wherein the manganese salt in the co-precipitation of the core material precursor is any one selected from the group consisting of manganese chloride, manganese sulfate, manganese acetate, manganese nitrate, manganese carbonate and manganese oxalate, or a combination of at least two selected therefrom, and wherein the aluminum salt in the co-precipitation of the core material precursor is any one selected from the group consisting of aluminum chloride, aluminum sulfate, aluminum acetate, aluminum nitrate, aluminum carbonate and aluminum oxalate, or a combination of at least two selected therefrom.

3. The process according to claim 1, wherein the nickel salt, cobalt salt and manganese salt in step (a) of the co-precipitation of the core material precursor have a metal element molar ratio of 6-9:0-2.5:0-2.5, including 0, wherein the nickel salt, cobalt salt and aluminium salt in step (a') of the co-precipitation of the core material precursor have a metal element molar ratio of 6-9:0-2.5:0-2.5, including 0, and wherein each component of the solution(s) formulated in step (a) and/or step (a') of the co-precipitation of the core material precursor has a concentration of 1-3 mol/L.

4. The process according to claim 1, wherein the nickel salt in the co-precipitation of the shell material solution is any one selected from the group consisting of nickel chloride, nickel sulfate, nickel nitrate, nickel carbonate, nickel acetate, nickel phosphate and nickel oxalate, or a combination of at least two selected therefrom, wherein the cobalt salt in the co-precipitation of the shell material solution is any one selected from the group consisting of cobalt chloride, cobalt sulfate, cobalt nitrate, cobalt carbonate, cobalt acetate, cobalt phosphate and cobalt oxalate, or a combination of at least two selected therefrom, wherein the manganese salt in the co-precipitation of the shell material solution is any one selected from the group consisting of manganese chloride, manganese sulfate, manganese acetate, manganese nitrate, manganese carbonate and manganese oxalate, or a combination of at least two selected therefrom, and wherein the aluminum salt in the co-precipitation of the shell material solution is any one selected from the group consisting of aluminum chloride, aluminum sulfate, aluminum acetate, aluminum nitrate, aluminum carbonate and aluminum oxalate, or a combination of at least two selected therefrom.

5. The process according to claim 1, wherein the nickel salt, cobalt salt and manganese salt in step (e) of the co-precipitation of the shell material solution have a metal element molar ratio of 1:0-1:0-1, wherein the nickel salt, cobalt salt and aluminum salt in step (e') of the co-precipitation of the shell material solution have a metal element molar ratio of 1:0-1:0-1, and wherein the solution(s) formulated in step (e) and/or step (e') of the co-precipitation of the shell material solution independently has a concentration of 1-3 mol/L.

6. The process according to claim 1, wherein the lithium source in step (2) is any one selected from the group consisting of lithium hydroxide, lithium carbonate, lithium nitrate, lithium oxalate, lithium formate, lithium bromide, lithium citrate and lithium chloride, or a combination of at least two selected therefrom, and wherein the lithium source and all the metal elements in the composite precursor in step (2) of the process for preparing the cathode material for nickel lithium ion battery have a molar ratio of 1-1.1:1.

7. The process according to claim 1, wherein the grinding in step (2) is carried out by ball grinding, wherein the grinding in step (2) of the process for preparing the cathode material for nickel lithium ion battery lasts for 10-15 hours.

8. The process according to claim 1, wherein the calcination in step (2) is carried out under oxygen atmosphere.

* * * * *